United States Patent [19]

Halliez

[11] Patent Number: 4,776,635
[45] Date of Patent: Oct. 11, 1988

[54] MODULAR SEAT FOR RAILWAY CARS

[75] Inventor: Gérard Halliez, Valenciennes, France

[73] Assignee: Alsthom, Paris, France

[21] Appl. No.: 67,175

[22] Filed: Jun. 29, 1987

[30] Foreign Application Priority Data

Jun. 27, 1986 [FR] France .................. 86 09381

[51] Int. Cl.[4] ............................................. A47C 7/00
[52] U.S. Cl. .................................. 297/443; 297/244; 297/183; 297/DIG. 2
[58] Field of Search ............ 297/183, 244, 158, 157, 297/232, 248, 443, DIG. 2

[56] References Cited

U.S. PATENT DOCUMENTS

| | | | |
|---|---|---|---|
| 1,912,576 | 6/1933 | Gazarian | 297/244 X |
| 2,572,482 | 10/1951 | Hover et al. | 297/DIG. 2 |
| 3,131,970 | 5/1964 | McGregor | 297/DIG. 2 |
| 3,630,566 | 12/1971 | Barecki | 297/244 |
| 3,669,495 | 6/1972 | Von Rudgisch | 297/443 |
| 3,747,978 | 7/1973 | Barecki | 297/183 |
| 3,841,704 | 10/1974 | Platner et al. | 297/DIG. 2 |
| 4,365,840 | 12/1982 | Kehl et al. | 297/443 |

FOREIGN PATENT DOCUMENTS

| | | |
|---|---|---|
| 0122245 | 10/1984 | European Pat. Off. . |
| 1322383 | 2/1963 | France . |
| 1803825 | 5/1970 | Fed. Rep. of Germany . |
| 2139128 | 2/1973 | Fed. Rep. of Germany ...... 297/244 |

Primary Examiner—Francis K. Zugel
Attorney, Agent, or Firm—Sughrue, Mion, Zinn, Macpeak & Seas

[57] ABSTRACT

A railway car seat modularly adaptable to provide various seating accommodations, consisting of a load bearing frame (10), a seat element (20) and a backrest element (30), where the frame (10) is made up of a tubular member (11) connecting two horizontal rail members (12) serving to support the seat element, the seat element (20) and backrest element (30) each having a semicircular channel (21A, 31A), both of which channels mate with the tube (11).

7 Claims, 5 Drawing Sheets

MODULAR SEAT FOR RAILWAY CARS

FIELD OF THE INVENTION

This invention concerns a railway car passenger seat, comprising a load bearing frame, at least one seat element and at least one backrest element.

BACKGROUND OF THE INVENTION

Railway passenger cars commonly have a variety of seating accommodations including single seats, double, triple seats and even four-place bench type accommodations. The load bearing frames and the seat and backrest elements are therefore different, making it necessary to manufacture and manage a large stock of frames and elements.

It is the object of this invention to obtain single or multiple seating using seat elements and backrest elements of modular design, with only the frame needing to be adapted to produce the desired number of seats.

SUMMARY OF THE INVENTION

The invention provides a railway car seat consisting of a load bearing frame, a seat element and a backrest element, wherein the frame is made up of a tubular member connecting two horizontal rail members serving to support the seat element, said seat element and backrest element each having a semicircular channel both of which channels mate with the tube member.

The seat according to the invention further comprises one of the following features:
the frame's tube member extends at least beyond one side of the seat to form, with two other rail members, the frame of an adjacent seat;
the seat and backrest elements each consist of a shell and a resilient upholstery;
the top of the backrest element also has a semicircular channel mateable with a horizontal bar which serves as a link to the backrest element of another seat, the two seats being placed back to back;
the horizontal bar is equipped with a hand grip;
the seat comprises two armrests connected to the frame tube by a clamp and to each shell by bolt means.

BRIEF DESCRIPTION OF THE DRAWINGS

A seat according to the invention will now be described, by way of example and with reference to the appended drawings, in which.

DESCRIPTION OF THE PREFERRED EMBODIMENT

Figure 1:
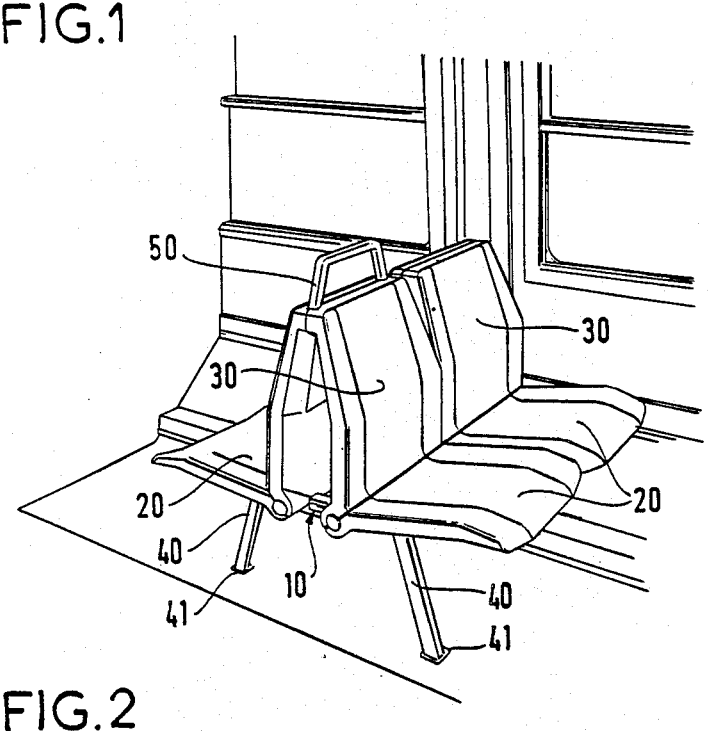
FIG. 1 shows four seats, arranged back to back in pairs.
Figure 2:
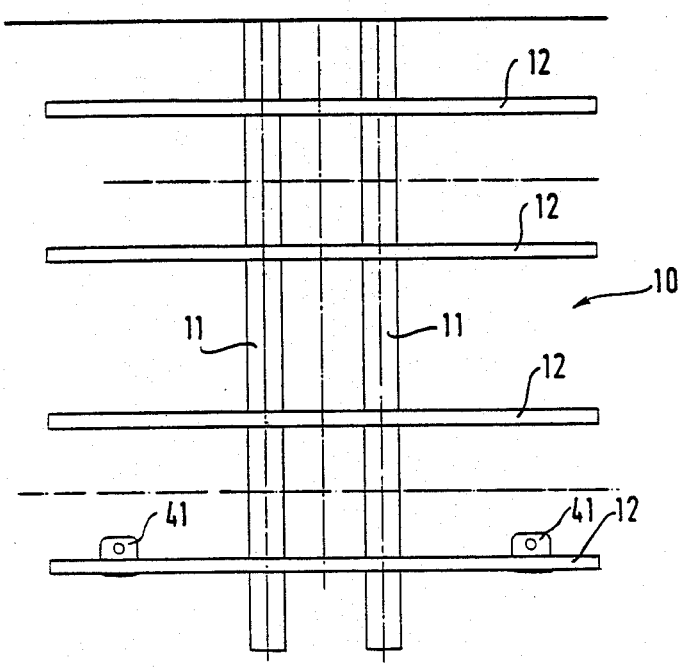
FIG. 2 is a top view of the bearing frame of the four seats drawn in FIG. 1.

The four seats arranged in pairs back to back can be seen in FIG. 1 to comprise a single frame 10, described in FIG. 2, four seat elements 20, four backrest elements 30, two legs 40 each having a flanged mounting foot 41, and lastly a hand grip 50. The sides of the seats opposite the legs are fastened to the side of the car.

Obviously, any combination or seating configuration is possible; the seat can be a single seat, or can be a double or triple seat, or a four-place "bench" seat made up of adjacent single seats, with or without armrests (an armrest being illustrated in FIG. 8); it can bear against a partition or be arranged back to back with another seat, be with or without a hand grip 50 and possibly have midspan legs, especially in the case of a three- or four-seat bench.

The top view of FIG. 2 shows the makeup of the bearing frame: two horizontal and parallel tubes 11, crossing four seat support rails 12.

It should be evident that the frame of a single seat (FIG. 3) consists of a tube 11 substantially equal in length to the width of the seat element, and of two half-rails.

The rail 12 nearest the aisle of the railway car is supported on two legs 40, each leg having a mounting flange or foot 41 bolted to the car floor.

Figure 3:
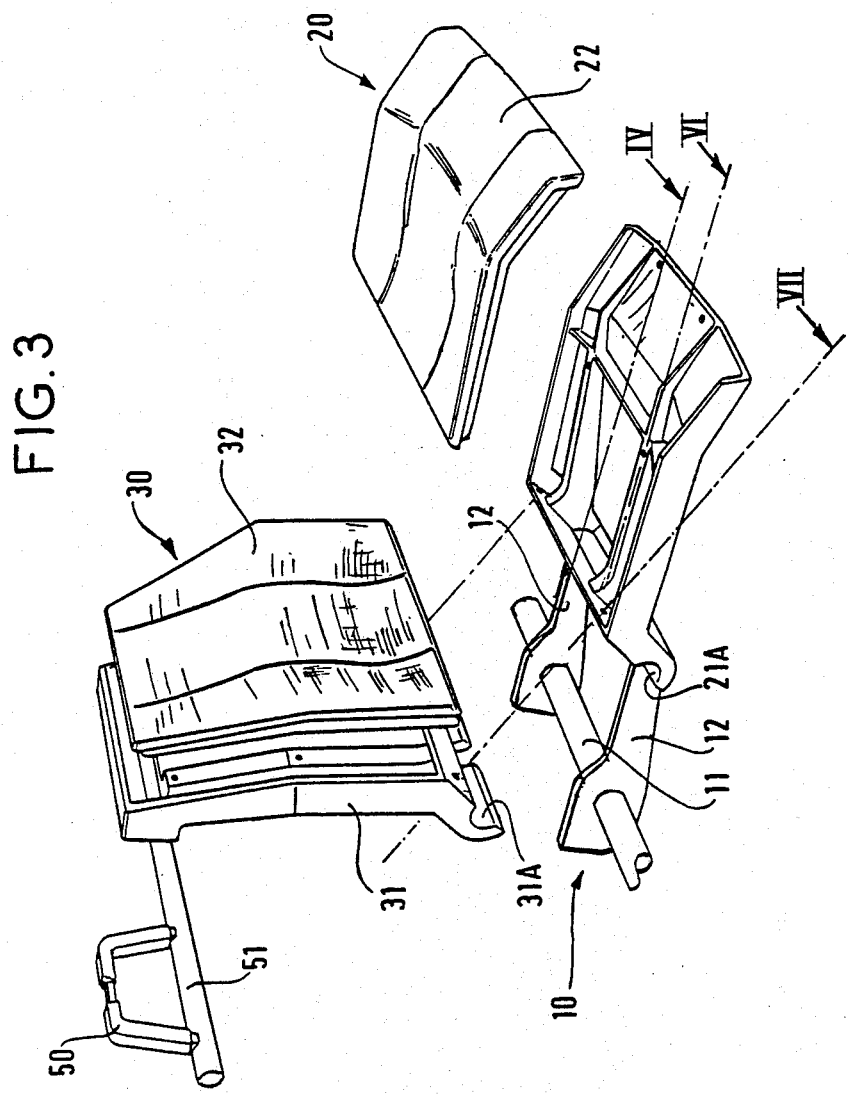
FIG. 3 is an exploded view of one of the seats.

In the exploded view of FIG. 3 a seat can be seen to comprise a tube or member 11, two rails or members 12, a seat element 20 consisting of a molded shell 21 and a resilient upholstery 22, and a backrest element 30 consisting of a molded shell 31 and a resilient upholstery 32. The shell 31 of the backrest element receives a horizontal bar 51 equipped with a hand grip 50 when the seat is located next to an aisle.

Figure 4:
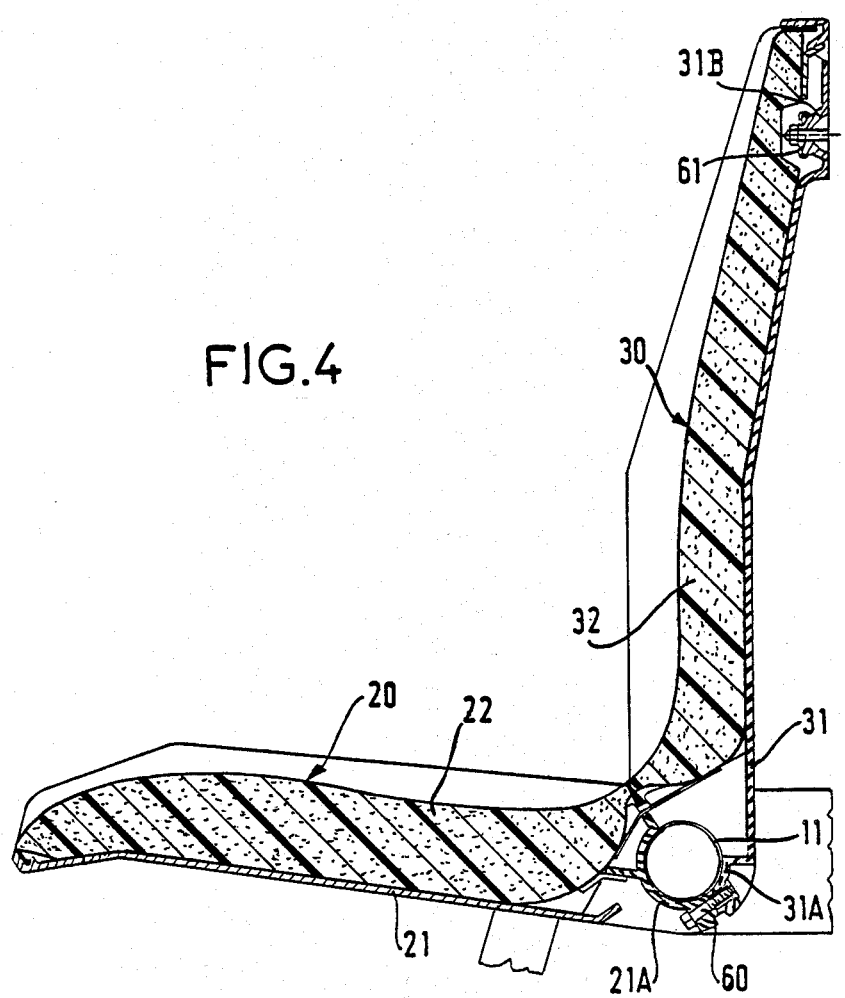
FIG. 4 shows a seat in axial cross section, along line IV of FIG. 3.

FIG. 4 shows an axial cross section of a tube 11, a seat element 20 and a backrest element 30.

The seat element 20 consists of a molded shell 21 comprising a semicircular channel 21A bearing against the tube 11, and a resilient upholstery 22.

The backrest element 30 consists of a molded shell 31 comprising a semicircular channel 31A also bearing against the tube 11.

Figure 5:
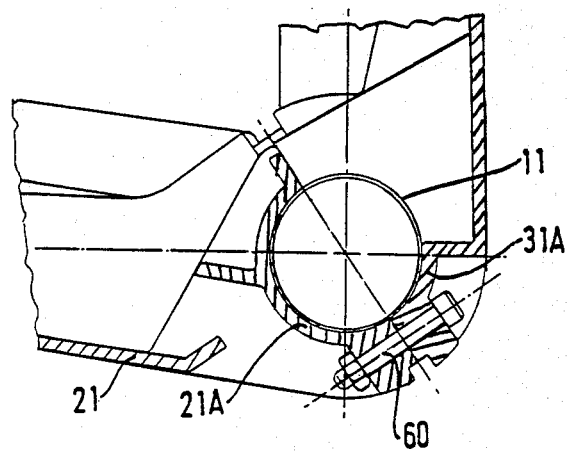
FIG. 5 is a detail of FIG. 4.

The two shells 21, 31 are secured to the tube by means of a bolt 60 visible in FIG. 5.

At the top of the backrest element 30 is another semicircular channel 31B enabling installation of the horizontal bar 51, this assembly being fastened by a bolt 61. Finally, the backrest element 30 comprises a resilient upholstery 32.

Figure 6:
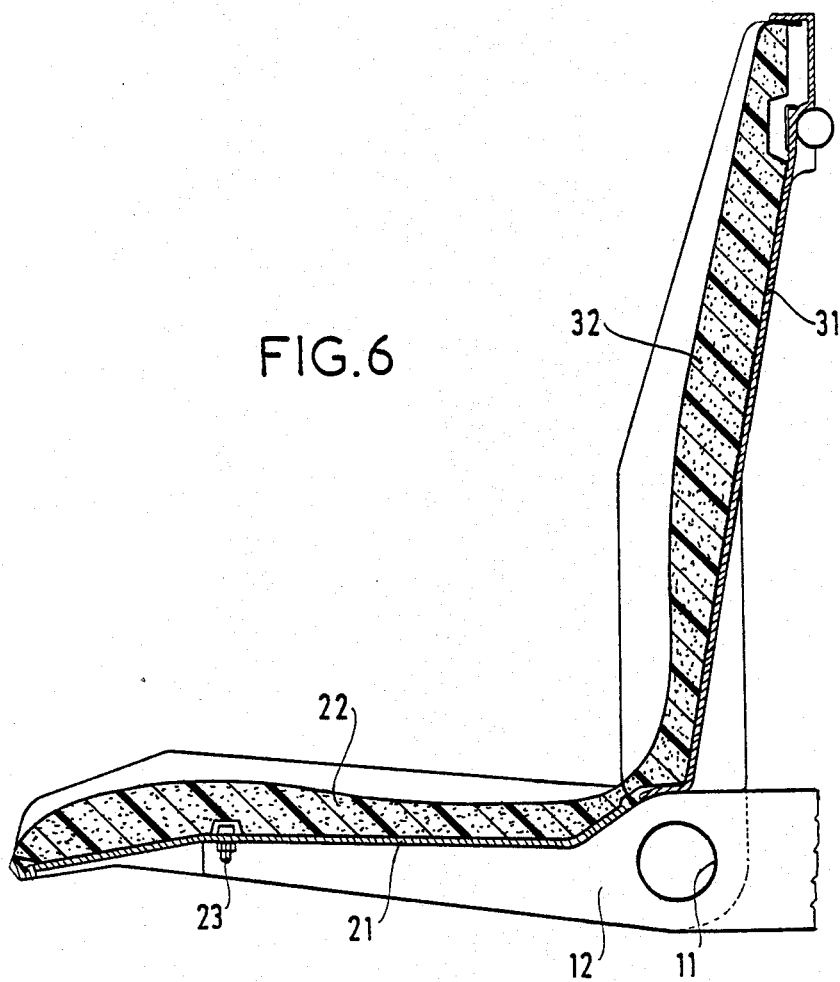
FIG. 6 is a cross section of the same seat, taken along line VI of FIG. 3.

FIG. 6 shows, in axial cross section along VI of FIG. 3, the same rail 11, the same seat element 20 and same backrest element 30.

The seat element 20 shell 21 is attached to each rail 12 with a bolt 23.

Figure 7:
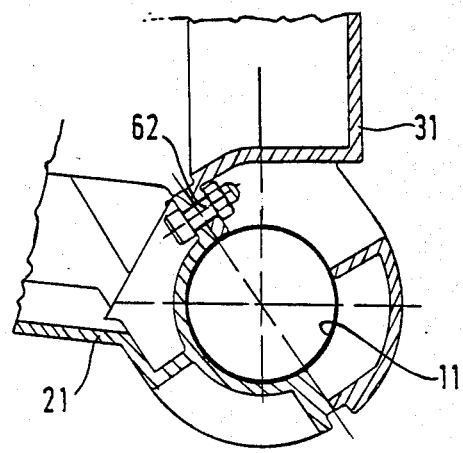
FIG. 7 shows a detail of the seat's attaching part, in cross section along line VII of FIG. 3.

FIG. 7 shows the side attachment of the two shells 21, 31 to the tube 11, by means of a bolt 62.

The two shells of a seat then are attached to the tube by means of a center bolt 60 and two lateral bolts 62.

Figure 8:
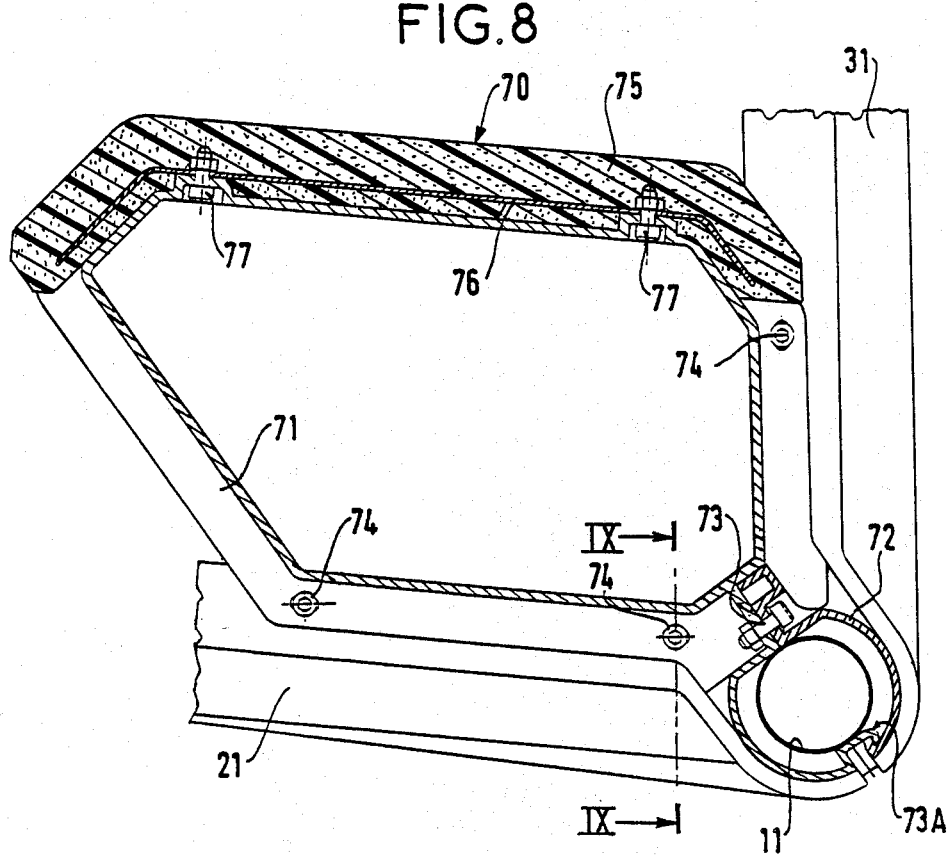
FIG. 8 shows an armrest in cross section along line VIII—VIII of FIG. 9.
Figure 9:
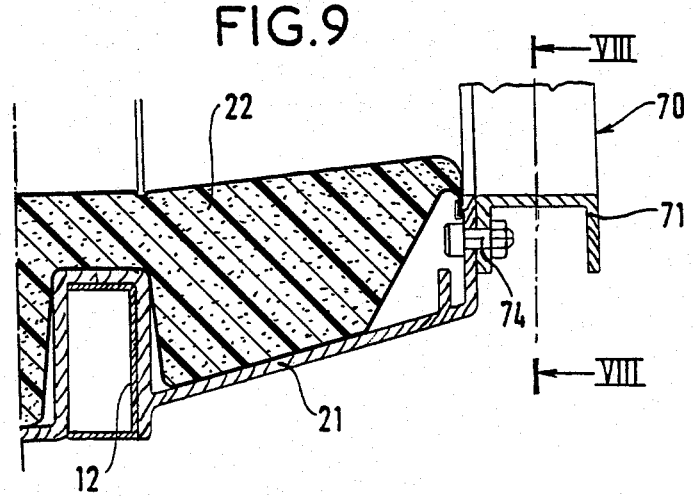
FIG. 9 shows the attachment of the armrest to the frame, in cross section along line IX—IX of FIG. 8.

FIG. 8 shows an armrest according to cross section VIII—VIII of FIG. 9. This armrest 70 consists of a metal frame 71 attached to the shell 21 and the shell 31 by means of bolts 74. The armrest frame 71 bears upon the tube 11 and is attached thereto by a collar including a clamp 72 having a hook fastener 73A and, diametrically opposite, a mounting bolt 73.

The armrest also has an upholstery 75 equipped with a metal insert 76 and attached to the armrest 70 frame 71 by two bolts 77.

In FIG. 9 can be seen the seat support rail 12, the seat shell 21 which engages with the rail 12, the upholstery 22 and the frame 71 of the armrest 70.

When two seats are arranged adjacently without an armrest, a spacer or bridge member of any suitable width is installed between the two seats and thus determines their spacing and accordingly the degree of passenger comfort.

What is claimed is:

1. A modular seat for a railway car comprising: a load bearing frame, a seat component and a back component, said load bearing frame comprising a horizontal tube, two laterally spaced horizontal bars fixed to said horizontal tube and extending at right angles thereto, the seat component and back component each being composed of a molded shell and a flexible covering, each molded shell terminating at one end in a semi-circular groove of a diameter complimentary to that of said horizontal tube, said seat component and said back component ends being positioned with said two grooves placed on said tube with said grooves surrounding said tube and said ends abutting, said two horizontal bars acting as a support for the shell of the seat component and means for fixedly mounting said molded shell seat component and back component to said horizontal tube at said abutting ends.

2. The seat in accordance with claim 1, wherein the horizontal tube of the load bearing frame is extended on at least one side of the seat to form with two other right angle, laterally spaced horizontal bars a bearing structure of an adjacent seat formed of a seat component and a back component, each composed of a molded shell and a flexible covering.

3. The seat in accordance with claim 1, wherein the back component has an upper part containing a semi-circular groove sized to and placed against a further horizontal bar, said further horizontal bar acting as a common connection with a back component of another seat, and said two seats being placed back to back via mirror image semi-circular grooves jointly surrounding said further horizontal bar.

4. The seat in accordance with claim 3, wherein the further horizontal bar is provided with an upright support handle projecting above the back to back seats.

5. The seat in accordance with claim 1, further comprising two arm rests connected to the horizontal tube by means of a collar surrounding said tube and to each shell by means of bolts.

6. The seat in accordance with claim 1, wherein said means for fixedly mounting said molded shell seat component and said back component to said horizontal tube comprises bolts coupling said molded shell components at said abutting ends at diametrically opposite positions.

7. The seat in accordance with claim 5, wherein said collar includes a semi-circular clamp 72 having at diametrically opposite positions a hook fastener and a mounting bolt.

* * * * *